United States Patent [19]

Crigler

[11] Patent Number: 4,463,534
[45] Date of Patent: Aug. 7, 1984

[54] GREENHOUSE STRUCTURES AND METHODS FOR THEIR CONSTRUCTION

[76] Inventor: T. P. Crigler, 851 S. County Line Rd., Hinsdale, Ill. 60521

[21] Appl. No.: 411,900

[22] Filed: Aug. 26, 1982

[51] Int. Cl.³ .......................... A01G 9/00; E04B 7/18
[52] U.S. Cl. ..................................... 52/395; 52/200; 52/481; 47/17
[58] Field of Search ................. 52/395, 481, 488, 200, 52/63, 95, 97; 47/17

[56] References Cited

U.S. PATENT DOCUMENTS

| | | | |
|---|---|---|---|
| 3,242,625 | 3/1966 | Tillinghast | 52/481 X |
| 3,862,530 | 1/1975 | Martine | 52/481 X |
| 4,070,806 | 1/1978 | Hubbard | 52/395 X |
| 4,117,638 | 10/1978 | Kidd et al. | 52/395 X |
| 4,231,205 | 11/1980 | Wendt | 52/481 |

FOREIGN PATENT DOCUMENTS

| | | | |
|---|---|---|---|
| 229343 | 2/1963 | Austria | 52/481 |
| 2338092 | 2/1974 | Fed. Rep. of Germany | 52/488 |

Primary Examiner—J. Karl Bell

[57] ABSTRACT

A greenhouse structure made of glass panels and having spaced parallel rails for supporting the structure, the glass panels being attached and supported at the upper portions of the rails, and a second set of transparent panels made of plastic material, the panels of the second set being attached and supported at the lower portion of the rails. The invention includes a special construction in which the rails have rims and a strip of plastic material extends about the lower part of the rails and engages a rim on the rail, this plastic material providing a pair of lips which receive the edge of the plastic panels.

The invention also includes methods of assembly in which a plastic panel is bowed to shorten the distance between the side edges of the panels so that it may be positioned between rails and then relaxed to cause the edges of the panel to snap into place between the lips of the plastic strip which is carried by each of the rails. The invention utilizes the second set of panels and their attachment to the lower portions of the rail to provide an air space between the panels which improves insulation in the greenhouse walls, and to make a thermal barrier against exterior temperature transmission from the outside into the greenhouse interior.

7 Claims, 6 Drawing Figures

U.S. Patent     Aug. 7, 1984     4,463,534
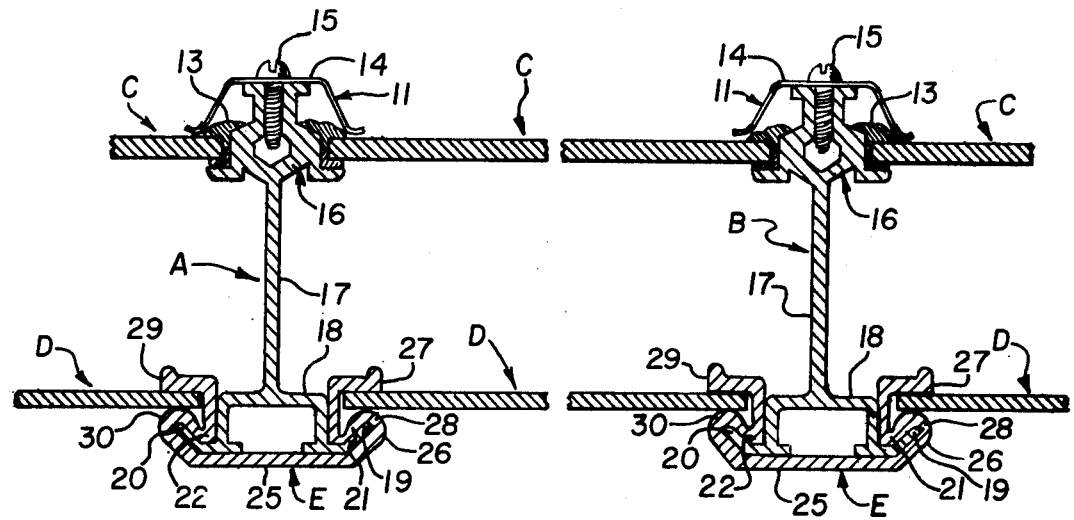
FIG. 1
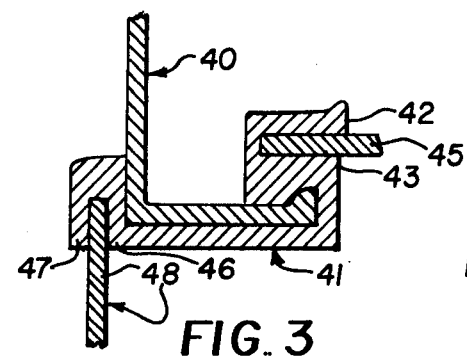
FIG. 3
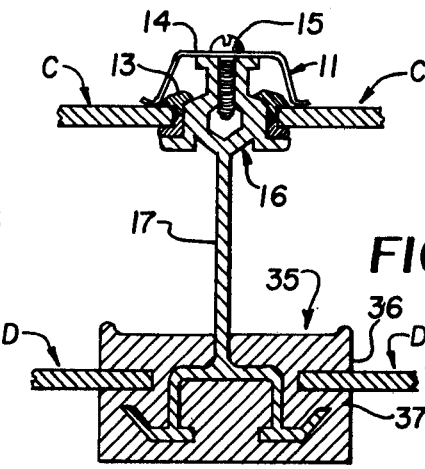
FIG. 2
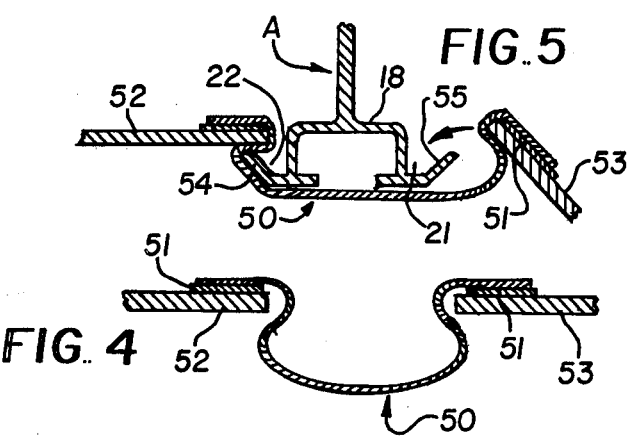
FIG. 5
FIG. 4
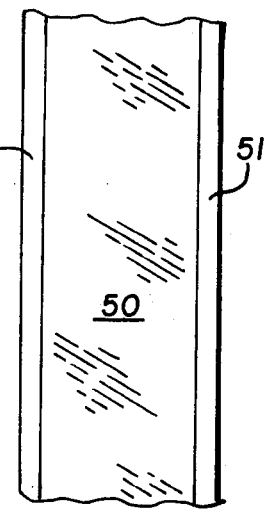
FIG. 6

GREENHOUSE STRUCTURES AND METHODS FOR THEIR CONSTRUCTION

This invention relates to the construction of greenhouses and to the structures so produced; more particularly it relates to such structures having walls which are insulated against heat transfer through the walls and providing a thermal break between the outside of the wall and the interior of the greenhouse.

BACKGROUND

It is usual that a greenhouse have outside walls made of glass panels. The glass panels are transparent and transmit sunlight through the panel making light and heat available to the plants on the interior of the greenhouse. The glass panels are also sufficiently rigid and give strength to the structure.

For holding the glass panels in place on the ceiling and side walls it is customary to provide metallic rails. These rails are arranged in spaced parallel relation along the ceiling and also on the sides of the greenhouse. This type of structure bears some resemblance to the use of rafters and studs in wood buildings. The rails bear resemblance also to I-beams. The glass panels are held and supported at their edges between the rails, with the edges of the glass panels being held by suitable attachment means to the upper portions of the rails. The rails are made of metal such as steel or aluminum and have a form similar to an I-beam so as to provide structural strength necessary for such a building. These metallic rails are good conductors of heat and their surfaces are exposed to the outside atmosphere and the interior of the greenhouse. A difficulty in the use of the structures just described has been that condensation forms on the metallic surfaces and drips or has to be carried away in some manner. Some manufacturers have designed their rails to provide troughs at the lower portion of the rails, to catch the condensation and to carry it away longitudinally of the rail.

It is an object of this invention to provide materials and methods of assembly which will give better insulation and avoid condensation that has attended prior greenhouse structures. Another object is to provide a structure which makes a thermal barrier to the passage of exterior temperature into the interior of the greenhouse. Yet another object is to provide a method by which the materials may be assembled easily and quickly, without difficulty. Further it is desired to provide such a method which can be utilized on location in connection with a presently existing greenhouse.

DESCRIPTION

Embodiments of my invention are illustrated in the accompanying drawing, in which:

FIG. 1 illustrates one embodiment of the invention and is a sectional view taken in a plane which is perpendicular with a pair of rails;

FIG. 2 illustrates a second modification and is a cross sectional view showing the use of an extruded strip for attaching the panel to the lower portion of the rail;

FIG. 3 illustrates a third modification showing yet another attachment of the panel to the lower portion of the rail, this modification being suitable for attaching panels which are at an angle with each other such as at a corner of the building;

FIG. 4 illustrates a fourth modification in which the attachment means includes a flexible strip having its edges adhesively secured to the panels, the view being taken similarly to that of FIGS. 1 to 3;

FIG. 5 is a further illustration of the modification shown in FIG. 4 and showing the assembly in which the panels are attached about the lower portion of the rail; and FIG. 6 is another illustration of the modification of FIGS. 4 and 5, and is a detailed view of the flexible strip when the adhesive material has been applied.

As illustrated in FIG. 1 the rail A has a cross section resembling an I-beam, the rail, as shown, being shown as extending perpendicular of the paper. Means 11 is provided for attaching the glass panel to the upper portion of the rail. As illustrated, this means includes a metal strip 14 with turned down edges, secured to the top of the rail by screw 15.

Below the upper portion 16 of the rail is a vertical wall 17 which contributes much strength, tending to keep the rail from sagging when it is used in the roof construction, and to keep the side walls from buckling. At the bottom of wall 17 the part 18 extends to the sides of the wall and then downward, and at the bottom of the rail there is on one side of the rail a rim 19, and on the other side of the rail there is a similar rim 20.

The rail B is identical with rail A, and extends parallel with the rail A at a spacing equal to the width of glass panel C.

The other side edge of glass panel C is held and supported by attachment to the upper portion of rail B in the same manner as was described in connection with rail A.

In the construction described up to this point it may be observed that the bottom side of the glass panel C, the rail walls 17, and the entire surface of the lower portion of the the rails are in contact with the interior of the greenhouse, which gives rise to the moisture condensation problems above discussed and permits the metal to act as a temperature conductor between the outside and the interior of the greenhouse. According to the present invention this situation is remedied by installation of a second set of panels D at a spaced distance from the panels C.

A strip E of plastic material has its middle portion 25 underlying the rail, and on the left hand side of rail A (as seen in FIG. 1) has its edge portion 26 turned about the rim 19, into the trough 21 and then turned upwardly and outwardly to form the upper lip 27 and the lower lip 28.

Similarly on the left hand side of rail A the edge portion of the strip is turned about the rim 20, into trough 22, then upwardly and back on itself to form the lips 29 and 30. On the right hand side of rail A the edge portion 26 takes the general form of the letter "S" with its lower loop opening inwardly of the rail and its upper loop opening outwardly of the rail. The edge portion of the strip on the other side of rail A takes the general form of the letter "S" which is reversed in that the lower loop of the "S" opens inwardly of the rail while the upper loop of the "S" opens outwardly of the rail.

The strip E may be made of a plastic material such as vinyl, polyethylene or other flexible plastic material with the required flexibility and plastic memory. It should possess enough plastic memory to bring the strip back to its molded shape so as to engage rims 19 and 20 after the "S" shaped portions of the strip have been spread apart to allow these portions to slip up over the rims 19 and 20.

The rail B may likewise be fitted with a plastic strip in the same manner. With this accomplished the panels D of the second glazing set may be installed. The panels D are also transparent. (By the term "transparent" I mean that objects on one side of the panel may be viewed from the other side of the panel). However, the panels may be tinted or otherwise decorated as may be desired. This second set of panels may be made of a suitable plastic material such as acrylic sheet or sheet material being sold under the trademark "Lexan". The panels of this second set should be bendable in the sense that a panel may be bowed to bring its side edges closer together.

To install one of these panels the panel is first bowed and one side edge of the panel is in a position to enter between the lips 27, 28 of the plastic material extending about rail A, and the other side edge of this panel is in a position to enter between the lips 29, 30 of the plastic material about rail B. Then the panel may be relaxed and its rigidity causes the sheet panel to flatten and so push its side edges fully into position within the lips of the plastic strips on rails A and B. When placed correctly as above described the panel "snaps" into place.

With the resilient panels mounted as above described and shown in FIG. 1, a dead air space is created between the glass panels C and the resilient panels D, so as to make for better insulation. In addition, the panels D, together with the strip E, provide a barrier to the transmission of temperature from the outside into the greenhouse. Another point is that though the lower portion of the rails has not previously been used except for providing structural strength to the rail and as a drip gutter, the present construction makes use of this lower rail portion to provide support and positioning for the panels E of the second set of panels.

FIG. 2 shows a second embodiment which is different from FIG. 1 in that instead of using a resilient strip such as strip E, a resilient composition 35 is extruded in the original manufacture of the metal parts to fill the area about the lower portion of the rails and provide the lips 36 and 37 for engaging the side edge of the panel D.

FIG. 3 of the drawing shows a third embodiment of the invention. In this case the rail 40 has an L-shaped cross section and the resilient strip 41 provides lips 42 and 43 to engage the panel 45 and lips 46 and 47 to engage the panel 48 which is positioned at right angles with panel 45. This construction is particularly good to facilitate glazing with a complete thermal break at corners of the greenhouse.

In the modification of FIG. 4 the strip 50 is made of flexible sheet material which is not necessarily resilient. For example the strip 50 may be vinyl or cloth backed vinyl, or may be made of other flexible material to provide the desired thermal barrier. According to this modification an adhesive 51 is applied to the under side of the edges of the strip 50, and an edge of the strip bearing the adhesive is placed on a side edge of a panel 52 on one side of the rail, and the other edge bearing the adhesive is placed on a side edge of a panel on the other side of the rail. To assemble the panels shown in FIG. 5, one panel is placed with its edge extending over the rim 54 of a rail, then the edge of the panel 53 on the other side of the rail, which is adhesively secured to the strip 50, is pushed over the rim 55 in the direction of the arrow in FIG. 5. In this assembly the panel 53 may be bowed to allow the edge of the panel to start over the rim 55, and then relaxed to allow the panel to flatten and so push the edge of the panel securely above the rim 55.

The adhesive referred to above may take the form of a liquid, hot melt, or contact adhesive, or may be a tape both sides of which have adhesive properties.

In the foregoing description it is assumed that the panels are on the roof or ceiling of the greenhouse as shown in FIG. 1. The same construction and assembly may be made on the sides or end walls of the greenhouse. In such cases the glass panels are on the outside of the wall and the panels D are on the inside of the wall. Also, in such case, the "upper portion" of the rail, as above described, would be toward the outside and the "lower portion" of the rail would be toward the inside of the greenhouse.

While only certain modifications of the invention are mentioned in the foregoing description, other modifications may be constructed and many changes may be made all within the spirit of the invention and the scope of the appended claims.

I claim:

1. A greenhouse structure comprising a pair of rails in spaced parallel relation, a glass panel, means for attaching the side edges of said glass panel to an upper portion of said rails, each of said rails having at its lower portion a rim running longitudinally along said rail, a strip of plastic material extending beneath each of said rails and about said rim, said material providing above said rim a pair of lips, and a bendable panel one side edge of which is engaged between the lips of said material which extends about the rim of one of said rails and the other side edge of which is engaged between the lips of said material which extends about the rim of the other of said rails.

2. A structure as set forth in claim 1 in which said plastic material is a strip the side edges of which are turned upwardly and inwardly above said rim, said side edges engaging said rim to hold said material in place.

3. A structure as set forth in claim 2 in which said side edge portions are turned back outwardly to form lips.

4. A structure as set forth in claim 2 in which said rim extends laterally and upwardly of said rail to form with the lower portion of said rail a trough which is engaged by said inwardly turned edge portion.

5. A method for installing a transparent panel in a greenhouse structure having spaced parallel rails each of which has a rim running longitudinally of the rail at the lower portion of the rail, comprising placing an plastic strip under each rail which strip extends about the rim of the rail, each of said plastic strips providing a pair of lips for engaging an edge portion of a panel and then inserting a side edge portion of said transparent panel between the lips of the strip on one of said rails and the other side edge portion of said transparent panel between the lips of the strip on the other of said rails.

6. A method as set forth in claim 5 which includes the step of bowing said transparent panel to bring the side edges of the panel closer together prior to inserting the side edges of the panel between said lips, and, after said side edges have entered between said lips in the strips on each of said rails, permitting the panel to flatten and so cause the panel edge portions to fully enter between said lips.

7. A greenhouse structure comprising a rail, a pair of glass panels one of which is on one side of said rail and the other of which is on the other side of said rail, means for attaching side edges of said panels to an upper portion of said rail, at a lower portion of said rail and on each side of the rail a rim running longitudinally along the rail, a pair of transparent panels spaced below said glass panels, a strip of flexible material extending under said rail and having its one side edge portion adhesively secured to a side edge portion of one of said transparent panels and having its other side edge portion adhesively secured to the side edge portion of the other of said transparent panels, each of said side edge portions of said transparent panels extending over one of said rims.

* * * * *